United States Patent
Hoffmann

(10) Patent No.: US 9,638,372 B2
(45) Date of Patent: May 2, 2017

(54) OPERATING GAS SYSTEM FOR AN UNDERWATER VEHICLE, METHOD FOR OPERATING SUCH AN OPERATING GAS SYSTEM AND AN UNDERWATER VEHICLE HAVING SUCH AN OPERATING GAS SYSTEM

(71) Applicant: SIEMENS AKTIENGESELLSCHAFT, Munich (DE)

(72) Inventor: Joachim Hoffmann, Burgthann (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 78 days.

(21) Appl. No.: 14/423,347

(22) PCT Filed: Jul. 18, 2013

(86) PCT No.: PCT/EP2013/065146
§ 371 (c)(1),
(2) Date: Feb. 23, 2015

(87) PCT Pub. No.: WO2014/029564
PCT Pub. Date: Feb. 27, 2014

(65) Prior Publication Data
US 2015/0204486 A1     Jul. 23, 2015

(30) Foreign Application Priority Data
Aug. 23, 2012 (EP) .................................... 12181553

(51) Int. Cl.
*B63G 8/08*     (2006.01)
*B63H 21/00*     (2006.01)
(Continued)

(52) U.S. Cl.
CPC ................ *F17C 9/02* (2013.01); *B63G 8/001* (2013.01); *B63G 8/08* (2013.01); *B63H 21/00* (2013.01);
(Continued)

(58) Field of Classification Search
CPC .......... B63G 8/001; B63G 8/08; B63H 21/00; B63H 21/38; F17C 11/00; F17C 6/00;
(Continued)

(56) References Cited

FOREIGN PATENT DOCUMENTS

| DE | 102008040211 A1 | 1/2010 |
|----|-----------------|--------|
| EP | 1454826 A1 | 9/2004 |

(Continued)

OTHER PUBLICATIONS

Psoma, et al.; "Fuel cell systems for submarines: from the first idea to serial production;" Journal of Power Sources; Elsevier SA; vol. 106; No. 1-2; pp. 381-383; ISSN: 0378-7753, DOI, 10.1016 1s0378-7753(01)01044-8; XP004348713; 2002; CH; Apr. 1, 2002.
(Continued)

*Primary Examiner* — Jacob T Minskey
*Assistant Examiner* — Minh-Chau Pham
(74) *Attorney, Agent, or Firm* — Laurence Greenberg; Werner Stemer; Ralph Locher

(57) ABSTRACT

An operating gas system for an underwater vehicle, particularly for a submarine or an unmanned underwater vehicle, includes a fuel cell system and an operating gas vessel connected in terms of flow to the fuel cell system. In order to achieve simple and efficient storage of boil-off gasses, a gas-receiving device is also provided and is connected to the operating gas vessel. The gas-receiving device contains a sorbent for receiving boil-off gas from the operating gas vessel. The boil-off gas, which is produced in the operating vessel with an operating gas for the fuel cell system and which cannot be consumed directly in the fuel cell reaction,
(Continued)

Figure 1:
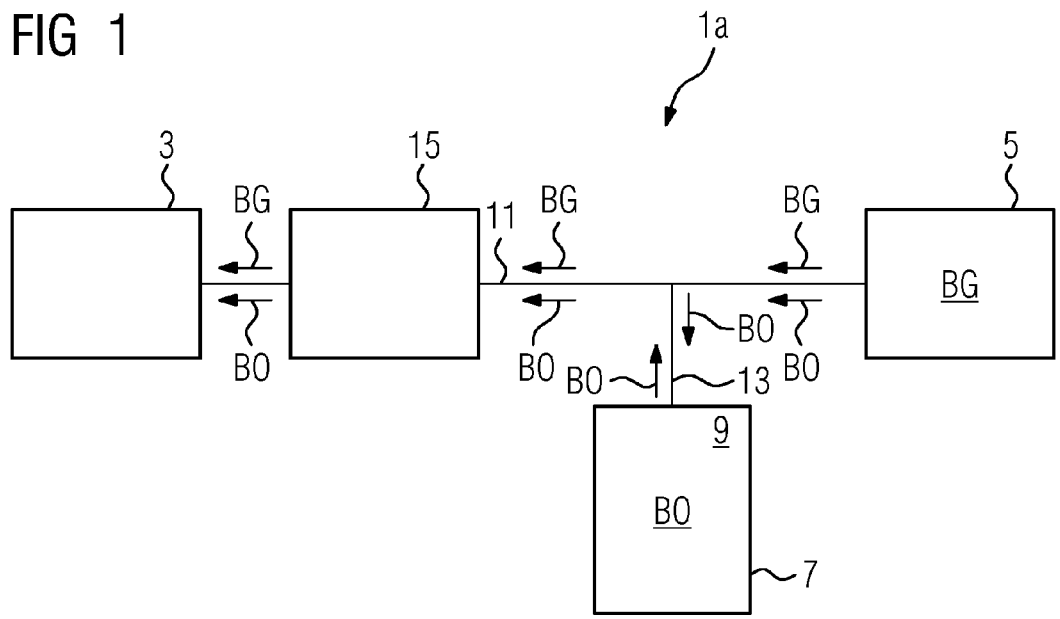

is therefore collected and stored with the aid of the sorbent in the gas-receiving device. A method for operating an operating gas system and an underwater vehicle are also provided.

20 Claims, 2 Drawing Sheets

(51) Int. Cl.
*B63H 21/38* (2006.01)
*F17C 11/00* (2006.01)
*F17C 6/00* (2006.01)
*F17C 9/02* (2006.01)
*H01M 8/04029* (2016.01)
*C01B 3/00* (2006.01)
*H01M 8/04089* (2016.01)
*H01M 8/04082* (2016.01)
*F17C 9/04* (2006.01)
*B63G 8/00* (2006.01)
*B63J 3/00* (2006.01)
*B63J 99/00* (2009.01)

(52) U.S. Cl.
CPC ........... *B63H 21/38* (2013.01); *C01B 3/0026* (2013.01); *F17C 6/00* (2013.01); *F17C 9/04* (2013.01); *F17C 11/00* (2013.01); *H01M 8/04029* (2013.01); *H01M 8/04089* (2013.01); *H01M 8/04208* (2013.01); *H01M 8/04216* (2013.01); *B01D 2257/104* (2013.01); *B01D 2257/108* (2013.01); *B01D 2259/4516* (2013.01); *B01D 2259/4566* (2013.01); *B63G 2008/002* (2013.01); *B63H 2021/003* (2013.01); *B63J 2003/001* (2013.01); *B63J 2099/003* (2013.01); *F17C 2201/06* (2013.01); *F17C 2221/011* (2013.01); *F17C 2221/012* (2013.01); *F17C 2223/0161* (2013.01); *F17C 2223/033* (2013.01); *F17C 2225/0123* (2013.01); *F17C 2225/033* (2013.01); *F17C 2250/01* (2013.01); *F17C 2265/032* (2013.01); *F17C 2270/0131* (2013.01); *F17C 2270/0184* (2013.01); *F17C 2270/0581* (2013.01); *H01M 2250/20* (2013.01); *Y02E 60/321* (2013.01); *Y02E 60/327* (2013.01); *Y02E 60/50* (2013.01); *Y02T 70/5263* (2013.01); *Y02T 90/32* (2013.01); *Y02T 90/38* (2013.01)

(58) Field of Classification Search
CPC . F17C 9/02; H01M 8/04029; H01M 8/04089; H01M 8/04208; H01M 8/04216
USPC ............ 55/385.1; 62/48.1; 114/312; 429/408
See application file for complete search history.

(56) References Cited

FOREIGN PATENT DOCUMENTS

JP 2003056799 A 2/2003
KR 20110018737 A 2/2011

OTHER PUBLICATIONS

Pommer H., et al.; "Brennstoffzellen als aussenluftunabhaengige Antriebskornponente fuer Uboote;" Schiff undHafen, Seehafen Vertlag GmbH; vol. 44; No. 8; pp. 48-51; ISSN: 1436-8498; XP000288856; 1992; DE; Jun. 1, 1992.
Kubisch, et al.; "Brennstoffzellenanlagen an Bord einschliesslich Wasserstoffspeicherung in Metallhydrid. Fuel Cell Systems Aboard Submarines Including Hydrogen Storage in Metal Hydrides;" Jahrbuch der Schiffbautechnischen Gesellschaft, Berlin; vol. 88, pp. 75-78; ISSN: 0374-1222; X0000198809; 1994; DE; Jan. 1, 1994.

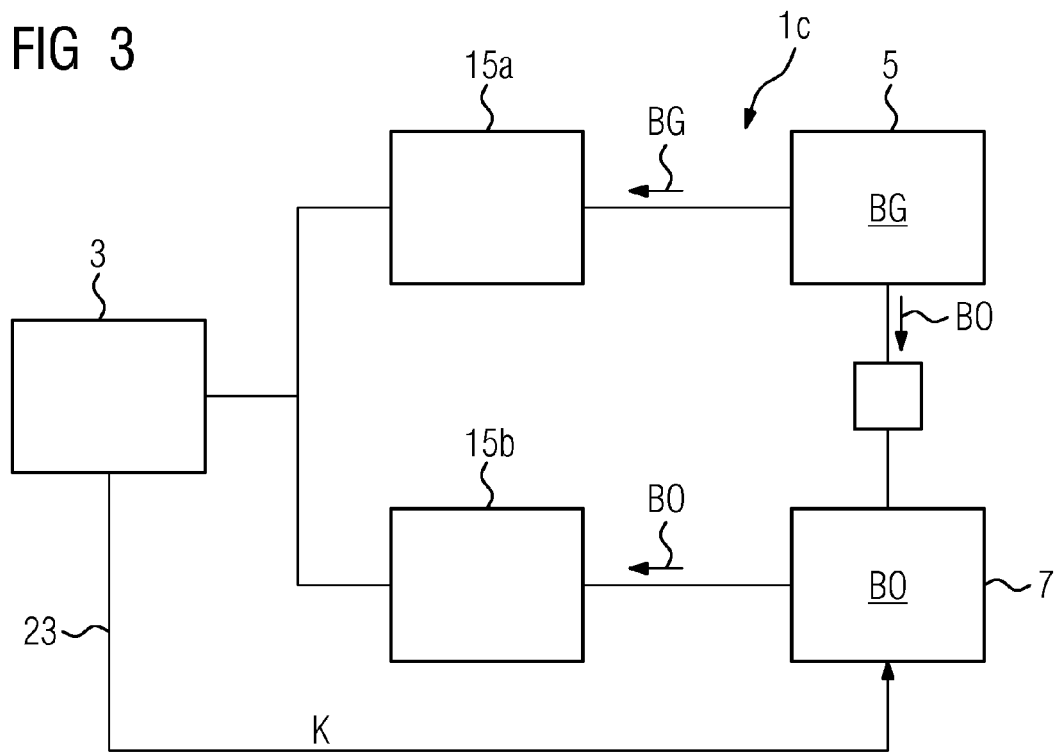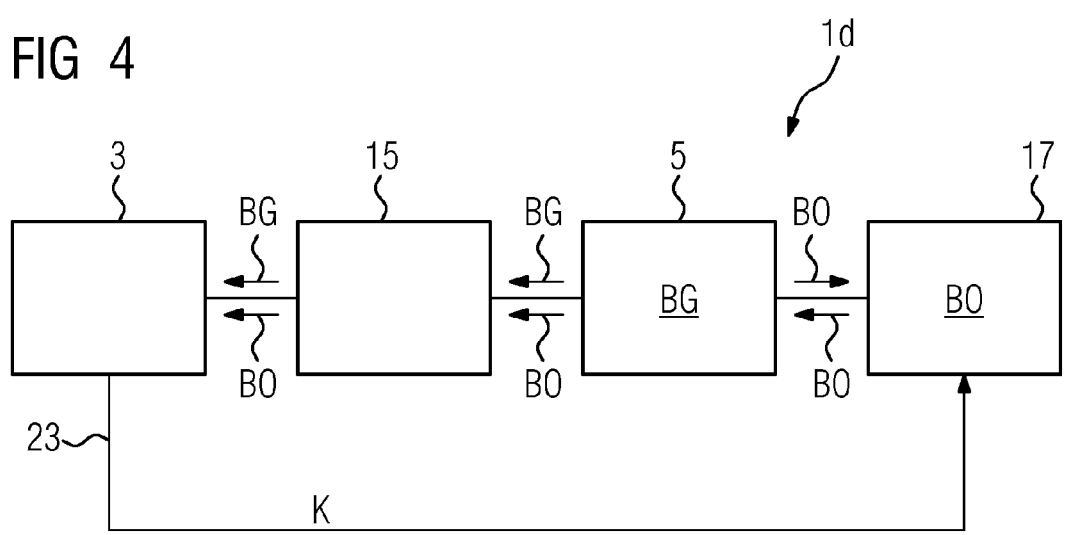

OPERATING GAS SYSTEM FOR AN UNDERWATER VEHICLE, METHOD FOR OPERATING SUCH AN OPERATING GAS SYSTEM AND AN UNDERWATER VEHICLE HAVING SUCH AN OPERATING GAS SYSTEM

BACKGROUND OF THE INVENTION

Field of the Invention

The invention relates to an operating gas system for an underwater vehicle, in particular for a submarine or an unmanned underwater vehicle. The invention further relates to a method for operating such an operating gas system and an underwater vehicle having such an operating gas system.

Underwater vehicles, such as submarines for example, are equipped inter alia with fuel cell systems by means of which energy for the operation of the vehicle is generated. The fuel cell system is supplied with pure hydrogen and oxygen or with gases containing hydrogen and/or oxygen. There are number of possibilities for storing the operating gases hydrogen and oxygen, for example in the form of liquified gases in cryotanks, in the form of compressed gases in pressure vessels or adsorbed or absorbed on/in a carrier material, such as in a metal hydride storage.

If a gas is stored in liquid form, a small quantity of the liquid gas always evaporates, this being what is known as a boil-off gas, as the supply of heat cannot be prevented on a permanent basis. As long as the evaporated gas can be disposed of into the surrounding atmosphere, this does not result in any problems. The situation becomes problematic, however, if the evaporation takes place within a closed system, such as an underwater vehicle, which does not permit an exchange with the atmosphere. In this case the boil-off gases in the interior of the vehicle must be received and stored if no process which can be used for the chemical synthesis of the gases (e.g. by means of conversion in a fuel cell reaction or during combustion) is available in the interior of the vehicle.

Pressure vessels, into which the released gas flows, are generally used for storing the boil-off gases. The capacity or maximally achievable pressure of such a pressure vessel is determined by the design pressure of the vessel. Alternatively, the two operating gases hydrogen and oxygen can be worked off in controlled reactions (combustion), thus generating water as a product, which is easier to manage.

BRIEF SUMMARY OF THE INVENTION

The invention is based on the object of enabling a simple and efficient storage of boil-off gases in an underwater vehicle.

According to the invention the object is achieved by an operating gas system for an underwater vehicle, particularly for a submarine or an unmanned underwater vehicle, comprising a fuel cell system, an operating gas vessel which is connected for flow to the fuel cell system, and a gas-receiving device which contains a sorbent for receiving the boil-off gas from the operating gas vessel, wherein the gas-receiving device is connected to the operating gas vessel.

According to the invention the object is further achieved by a method for operating an operating gas system for an underwater vehicle, particularly for a submarine or an unmanned underwater vehicle, wherein the underwater vehicle has a fuel cell system for generating energy, wherein an operating gas for the fuel cell system is stored in an operating gas vessel and wherein boil-off gas is fed from the operating gas vessel into a gas-receiving device containing a sorbent.

According to the invention the object is additionally achieved by an underwater vehicle, particularly a submarine or an unmanned underwater vehicle, having such an operating gas system.

The advantages and preferred embodiments cited below in relation to the operating gas system can be transferred to the method and the underwater vehicle accordingly.

The invention is based on the idea of gathering up a boil-off gas, which arises in the operating vessel with the operating gas and which cannot be used directly in the fuel cell reaction, and storing said boil-off gas in a gas-receiving device with the aid of the sorbent. Here both the operating gas vessel and the gas-receiving device constitute gas stores, which differ from one another in terms to construction, functionality and capacity and are optimized with regard to their use.

Depending on the type of the sorbent it can either adsorb or absorb the boil-off gas. Through the use of adsorption and/or absorption it is therefore possible to store a large quantity of boil-off gas in a reversible manner. The boil-off gas is received by the sorbent and the boil-off gas, under suitable physical conditions (pressure, temperature), is released once more into the operating system and is available for further utilization in the interior of the underwater vehicle. In this way a larger quantity of boil-off gas can be stored in comparison with a conventional pressure store, which enables an optimal utilization of the operating gases carried along in the underwater vehicle.

The gas-receiving device having the sorbent is arranged such that a flow connection to the operating gas vessel exists on the other side and a flow connection to the fuel cell system exists on the other side. In the simplest case, a flow connection of this type is produced by an ancillary line branching off from a main line which connects the operating gas vessel to the fuel cell system, so that the boil-off gas initially flows into the main line and is subsequently fed into the ancillary line. The operating gas vessel and the gas-receiving device are thus, as it were, connected in parallel to the fuel cell system, so that a gas supply to the fuel cell system can take place from both gas stores independently from one another. The process is additionally simplified if the operating gas vessel and the gas-receiving device have a common pressure regulation for example.

Alternatively, however, it is also possible that the gas-receiving device is coupled directly to the operating gas vessel via the ancillary line, and that a separate line leads from the gas-receiving device into the fuel cell system or into the operating gas main line.

According to a third alternative the fuel cell, the operating gas vessel and the gas-receiving device are connected consecutively on the main line in series.

According to a preferred embodiment the fuel cell system has a cooling system, wherein a coolant line of the cooling system leads to the gas-receiving device. A coolant circulates in the cooling system to cool the fuel cell system during the operation thereof. The coolant performance ensures that the gas-receiving device is cooled by the coolant of the fuel cell system. This solution is particularly space-saving, as no second cooling system for temperature regulation of the gas-receiving device is required.

According to a further preferred embodiment the fuel cell system and the gas-receiving device are arranged consecutively on the coolant line in series, so that the coolant is initially fed into the fuel cell system and subsequently fed into the gas-receiving device. Such a series connection of the fuel cell system and the gas-receiving device has the major advantage that, when the fuel cell system is switched off, no waste heat or only a small amount of waste heat which must be removed from the coolant is released, so that the coolant is practically only used for cooling the sorbent in the gas-receiving device. On the other hand during operation of the fuel cell system the waste heat is initially discharged from the fuel cell system with the aid of the coolant and only then is the heated coolant conducted to the sorbent. This facilitates the release of the received operating gas in the gas-receiving device, so that the boil-off gas is converted in the fuel cell system.

Provision is preferably made for a pressure regulator for regulating the pressure in the gas-receiving device. This results in the receiving and the release of the boil-off gas from the sorbent being regulated with regard to pressure. During the adsorption/absorption phase the pressure is raised, so that more boil-off gas is fixed to the surface of the sorbent. For desorption, the pressure is reduced, in particular a pressure gradient between the fuel cell system and the gas-receiving device is set so that the gas from the gas-receiving device is fed into the fuel cell system. The sorbent is therefore regenerated once more and is available for a new loading phase.

As an alternative or in combination with pressure regulation a temperature regulator is advantageously provided for regulating the temperature in the gas-receiving device. Here, the receiving and the release of the boil-off gas from the sorbent is regulated with regard to temperature. Within the context of the invention, a temperature regulator is for example the cooling system in which coolant is conducted to the gas-receiving device.

Preferably the sorbent is provided for adsorbing the boil-off gas; in particular the sorbent is a molecular sieve. Molecular sieves are natural or synthetic zeolites which have a strong adsorption capacity for gases with certain molecular sizes. Molecular sieves are suitable for the adsorption of both oxygen and hydrogen.

According to an alternative preferred variant, the sorbent is provided for adsorbing the boil-off gas; in particular the sorbent is a metal hydride. Metal hydrides are particularly suitable for receiving hydrogen. The use of metal hydrides in submarines has been known for a long time. Until now, however, hydride storage has been used as the sole means of hydrogen storage and not in combination with another main gas stores, so that only the boil-off gas from the main gas store is supplied to the hydride storage. Since hydride storage is relatively expensive, the combination of the conventional main gas store and a hydride storage only for the boil-off gas results in the advantage that only small quantities of metal hydride are required, so that the costs for the operating gas system described above remain as low as possible.

The boil-off gas is advantageously fed from the operating gas vessel into the gas-receiving device when the fuel cell system is at a standstill. During operation of the fuel cell system the boil-off gas is supplied to the fuel cell system, in particular directly after the release of said boil-off gas with the operating gas. If, however, boil-off gas is created and the fuel cell system is not in operation, said gas is initially stored in the gas-receiving device.

BRIEF DESCRIPTION OF THE SEVERAL
VIEWS OF THE DRAWING

Figure 2:
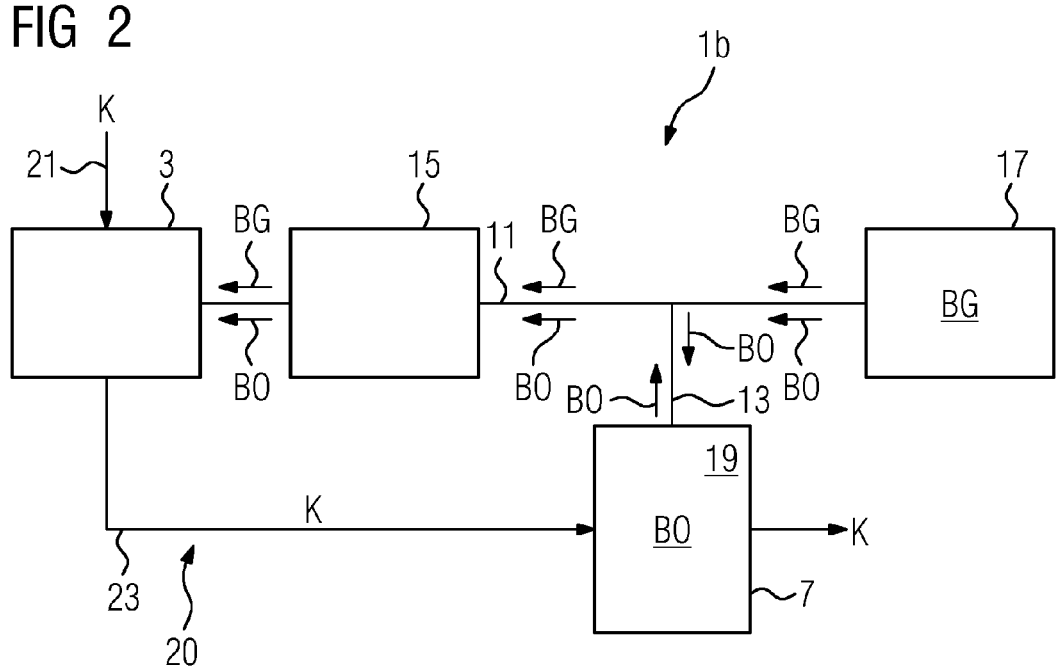

One exemplary embodiment of the invention is explained in greater detail with reference to a drawing. Here, in a schematically greatly simplified view:

FIG. 1 shows a first embodiment of an operating gas system for an underwater vehicle, FIG. 2 shows a second embodiment of an operating gas system for an underwater vehicle, FIG. 3 shows a third embodiment of an operating gas system for an underwater vehicle, and FIG. 4 shows a fourth embodiment of an operating gas system for an underwater vehicle.

DESCRIPTION OF THE INVENTION

In the different figures, identical reference characters have identical significance.

The operating gas system 1a shown in FIG. 1 comprises a fuel cell system 3, in which hydrogen and oxygen are combusted and electric current is generated as a result, an operating gas vessel 5 and a gas-receiving device 7. The operating gas system 1a is part of an underwater vehicle (not shown in greater detail here), which can be e.g. a submarine or an unmanned underwater vehicle (UUV). The operating gas system 1a shown in FIG. 1 merely illustrates the storage and the supply of one of the two operating gases BG hydrogen or oxygen to the fuel cell system 3. For the second operating gas BG the same or a similar arrangement of an operating gas vessel 5 and a gas-receiving device 7 can be provided.

The operating gas vessel 5 is in this exemplary embodiment embodied in the form of a cryotank. The cryotank 5 forms, as it were, the main gas store in the system. In the cryotank 5 is stored one of the operating gases BG in liquid form at a very low temperature. Although the operating gas BG is for the most part liquid, small quantities thereof evaporate and thus a so-called boil-off gas BO is created. Depending on the quantity of the boil-off gas BO this may not always be able to be contained in the cryotank 5; if the fuel cell system 3 is not in operation, however, the boil-off gas BO cannot work off directly after its release in the fuel cell system 3. In order to store this boil-off gas BO temporarily, the gas-receiving device 7 is therefore provided. The gas-receiving device 7 contains here an adsorbent 9, in the exemplary embodiment shown a molecular sieve in the form of a zeolite.

The fuel cell 3 is connected to the cryotank 5 via a main line 11, so that the operating gas BG can be fed directly into the fuel cell system 3 from the cryotank 5. An ancillary line 13, which opens into the gas-receiving device 7 with the molecular sieve 9, branches off from the main line 11. From the cryotank 5, boil-off gas BO can thus flow initially into the main line 11 and subsequently into the ancillary line 13 toward the molecular sieve 9; additionally the boil-off gas BO released from the molecular sieve 9 can be supplied to the fuel cell system 3 via the ancillary line 13 and subsequently via the main line 11. A corresponding valve system (not shown in greater detail here) is used to open or close the various lines 11, 13 or sections of said lines.

If the fuel cell system 3 is shut down, the boil-off gas BO is initially fed from the cryotank 5 into the gas-receiving device 7 filled with the molecular sieve 9. The boil-off gas BO adsorbs onto the molecular sieve 9 up to an equilibrium which is dependent on the adsorbent capacity, pressure and temperature in the gas-receiving device 7 If the boil-off gas BO is required for the reaction in the fuel cell arrangement 3, the pressure in the main line 11 is reduced via a pressure regulator 15. By means of the pressure gradient created the boil-off gas BO is desorbed and conducted into the fuel cell system 3. The loading quantity of the boil-off gas BO in the gas-receiving device 7 is determined by the quantity of available molecular sieve 9.

In the exemplary embodiment in accordance with FIG. 2 a pressure vessel 17 is used in place of a cryotank 5. The gas-receiving device 7 is additionally filled with a hydride storage, particularly a metal hydride. A hydride storage 19 of this type is particularly suitable for the absorption of hydrogen.

The significant difference in comparison with the embodiment in accordance with FIG. 1 is that in FIG. 2 the temperature regulation of the hydride storage 19 in the gas-receiving device 7 takes place with the aid of a coolant K for the fuel cell system 3. In addition to the pressure regulation via the pressure regulator 15, in FIG. 1 a temperature regulation takes place in the gas-receiving device 7 for receiving and for releasing the boil-off gas BO by means of the hydride storage 19.

For this purpose in a first step the coolant K, in particular cold water, is fed via a supply line 23 into the fuel cell system 3. Via a coolant line 23 the coolant K is subsequently supplied to the gas-receiving device 7. If no conversion is taking place in a fuel cell, unconsumed boil-off gas BO builds up. As a result of the stopped conversion in the fuel cell, no more heat is released here. The cooling system 20 of the fuel cell system 3 must therefore not discharge any more heat from the fuel cell. The cold coolant K is now conducted by means of hydride storage 19 connected in series with the fuel cell system 3, in order to discharge the absorption heat released here when hydrogen is received in the hydride storage 19.

As soon as the requirement for hydrogen in the fuel cell system 3 increases again, for example by the fuel cell reaction being started up again, heat from the fuel cell process is supplied to the coolant K once more. This heat is subsequently fed into the gas-receiving device 7 and delivered to the hydride storage 19. This activates the release of the absorbed hydrogen, said hydrogen in turn being able to be converted in the fuel cell system 3.

In the operating gas system 1c in FIG. 3 the boil-off gas BO flows for the most part in a separate line. Here two independent lines with a respective pressure regulator 15a, 15b open at the fuel cell system 3, which lines can be retrieved independently from one another. Arranged between the operating gas vessel 5 and the gas-receiving device 7 is a non-return valve 25, so that in the open state of the non-return valve 25 boil-off gas BO flows from the operating gas vessel 5 into the gas-receiving device 7.

In FIG. 4 a fourth arrangement of the components of the operating gas system 1d are shown. The operating gas vessel 5 and the gas-receiving device 7 are arranged in series with respect to the fuel cell system 3 and have a common pressure regulator 15.

In both FIG. 3 and FIG. 4 the coolant line 23 is indicated by a dotted line, which optionally flows to the gas-receiving device 7 in order to thermally influence the sorbent (9, 19) located there.

The operating gas systems 1a, 1b, 1c, 1d described in FIG. 1 and FIG. 2 are particularly suitable for use in underwater vehicles. The operating gas systems 1a, 1b enable an undesirable release of the excess boil-off gas BO to be avoided. Apart from a better utilization of the operating gases BG, for this purpose the operating gas systems 1a, 1b also make a contribution to extending the time period in which the boil-off gases BO are not blown out.

The invention claimed is:

1. An operating gas system comprising: a fuel cell system for supplying energy for an underwater vehicle or a submarine or an unmanned underwater vehicle; an operating gas vessel connected for flow to said fuel cell system; a gas-receiving device connected to said operating gas vessel, said gas-receiving device containing a sorbent for receiving boil-off gas from said operating gas vessel; and a cooling system for said fuel cell system, said cooling system having a coolant line leading from said fuel cell system to said gas-receiving device.

2. The operating gas system according to claim 1, wherein said fuel cell system and said gas-receiving device are disposed consecutively along said coolant line in series.

3. The operating gas system according to claim 1, which further comprises a pressure regulator for regulating pressure in said gas-receiving device.

4. The operating gas system according to claim 1, which further comprises a temperature regulator for regulating temperature in said gas-receiving device.

5. The operating gas system according to claim 1, wherein said sorbent adsorbs the boil-off gas.

6. The operating gas system according to claim 5, wherein said sorbent is a molecular sieve.

7. The operating gas system according to claim 1, wherein said sorbent absorbs the boil-off gas.

8. The operating gas system according to claim 7, wherein said sorbent is a hydride storage substance.

9. A method for operating an operating gas system for an underwater vehicle or a submarine or an unmanned underwater vehicle, the method comprising the following steps:
providing the underwater vehicle with a fuel cell system for generating energy;
storing an operating gas for the fuel cell system in an operating gas vessel;
feeding boil-off gas from the operating gas vessel into a gas-receiving device containing a sorbent; and
cooling the gas-receiving device by using a coolant of the fuel cell system.

10. The method according to claim 9, which further comprises initially feeding the coolant into the fuel cell system and subsequently feeding the coolant into the gas-receiving device.

11. The method according to claim 9, which further comprises regulating a receipt and a release of the boil-off gas from the sorbent with regard to pressure.

12. The method according to claim 9, which further comprises regulating a receipt and a release of the boil-off gas from the sorbent with regard to temperature.

13. The method according to claim 9, which further comprises adsorbing the boil-off gas by using the sorbent.

14. The method according to claim 13, wherein the sorbent is a molecular sieve.

15. The method according to claim 9, which further comprises absorbing the boil-off gas by using the sorbent.

16. The method according to claim 15, wherein the sorbent is a hydride storage substance.

17. The method according to claim 9, which further comprises feeding the boil-off gas from the operating gas vessel into the gas-receiving device when the fuel cell system is not operating.

18. An underwater vehicle, submarine or unmanned underwater vehicle, comprising an operating gas system according to claim 1.

19. The operating gas system according to claim 1, wherein said cooling system discharges heat from said fuel cell system.

20. The method according to claim 9, which further comprises using the coolant to discharge heat from the fuel cell system.

* * * * *